United States Patent [19]

Gramarossa et al.

[11] Patent Number: 4,906,345

[45] Date of Patent: Mar. 6, 1990

[54] APPARATUS FOR CARRYING ENCAPSULATED ELECTRONIC COMPONENTS THROUGH ELECTROPLATING TANKS AND SURFACE TREATMENT STATIONS

[75] Inventors: Daniel J. Gramarossa, Thousand Oaks; Frank J. Johnson, Cupertino; Heinz Wo W. Schlenker, Northridge, all of Calif.

[73] Assignee: Future Automation, Inc., Simi Valley, Calif.

[21] Appl. No.: 286,298

[22] Filed: Dec. 19, 1988

[51] Int. Cl.⁴ .............................................. C25D 17/28
[52] U.S. Cl. .................................... 204/202; 204/203
[58] Field of Search ..................... 204/202, 203-205

[56] References Cited

U.S. PATENT DOCUMENTS

| | | | |
|---|---|---|---|
| 2,558,090 | 6/1951 | Jernstedt | 204/205 |
| 4,508,611 | 4/1985 | Johnson et al. | 204/202 |
| 4,775,046 | 10/1988 | Gramarossa et al. | 204/202 X |

Primary Examiner—Donald R. Valentine
Attorney, Agent, or Firm—S. R. Rosenberg; T. Gunzler

[57] ABSTRACT

Improved apparatus for carrying encapsulated electronic components, having a conveyor belt defined by a horizontal web with a plurality of identical, flexible tines depending from both sides of the edge of the web. The web is formed into a continuous, endless loop adapted to be carried on a pair of vertical pulleys rotatable on horizontal shafts. Projecting cams, on the face of the web of the belt remote from the dependent tines, engage mating indentations in the periphery of the two pulleys guiding and imparting movement to the belt. The opposing groups of tines are urged apart, by spreader cams, at the beginning and end of the passage of the belt between the lower faces of the two pulleys. Parts to be plated are brought into the space between the tines which, upon exiting from the cams as the conveyor moves entrap the part between them and causing them to move through the plating tanks and treatment stations positioned along the path of the conveyor. The conveyor belt releases the plated and treated parts, upon the separation of the tines, allowing the parts to drop into receiving containers. The conveyor belt is a conductive material and is utilized as the cathode of the plating system.

9 Claims, 5 Drawing Sheets

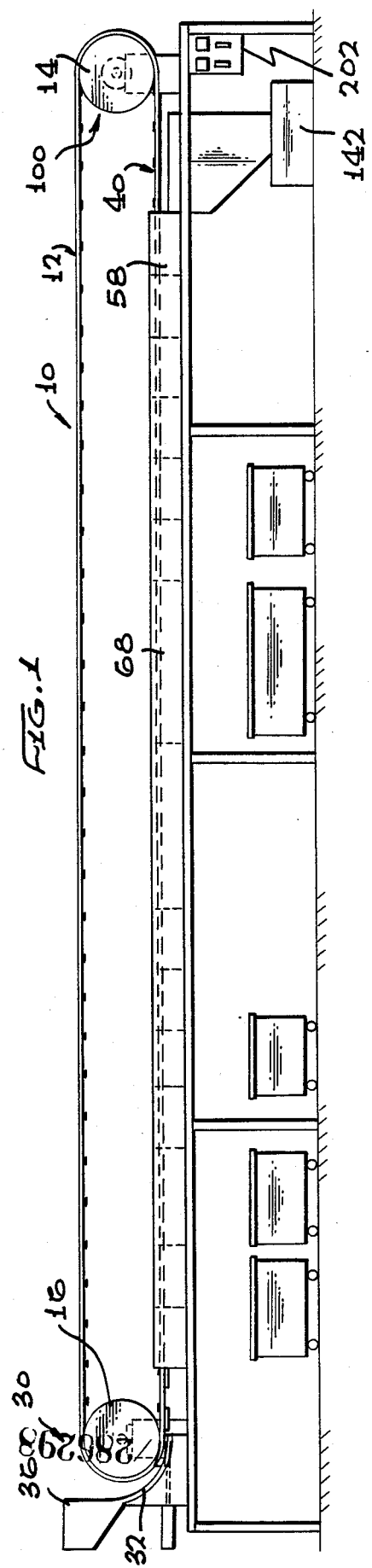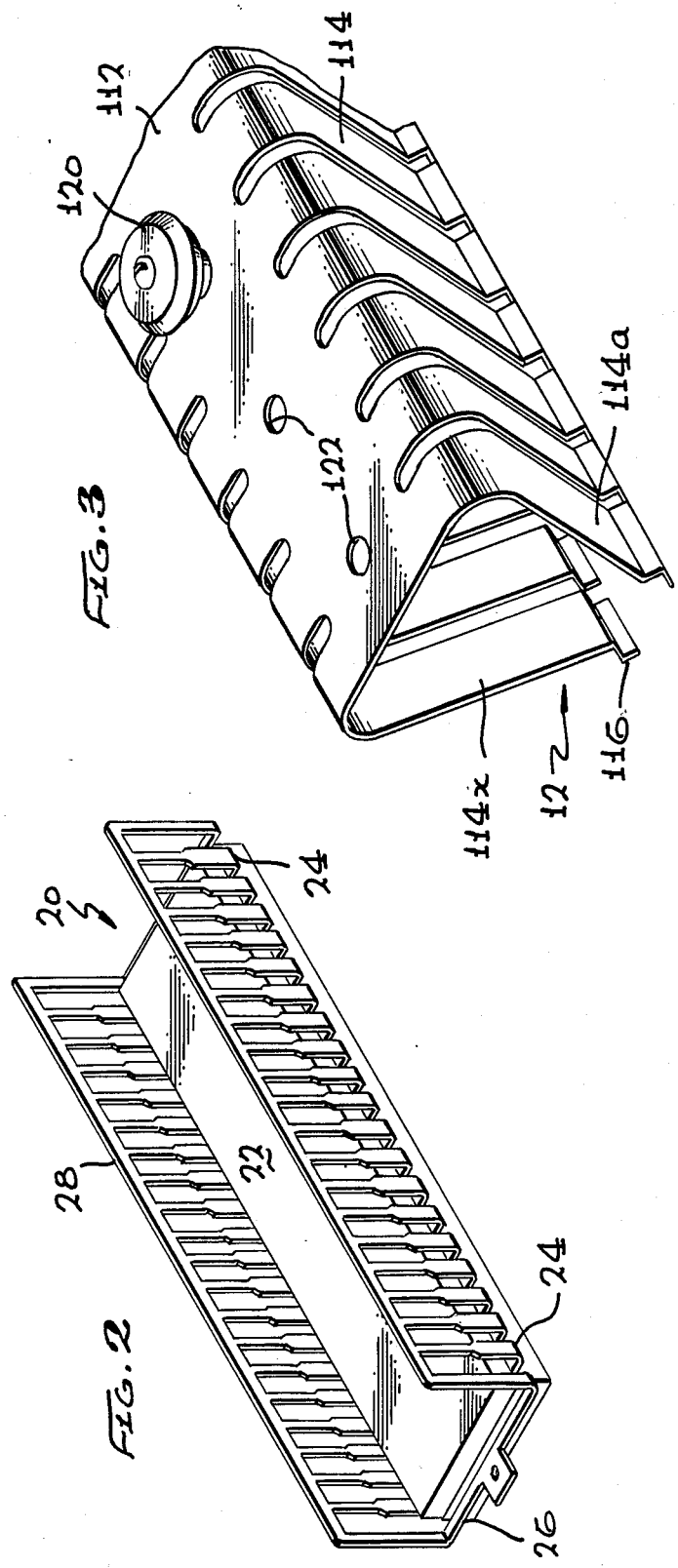

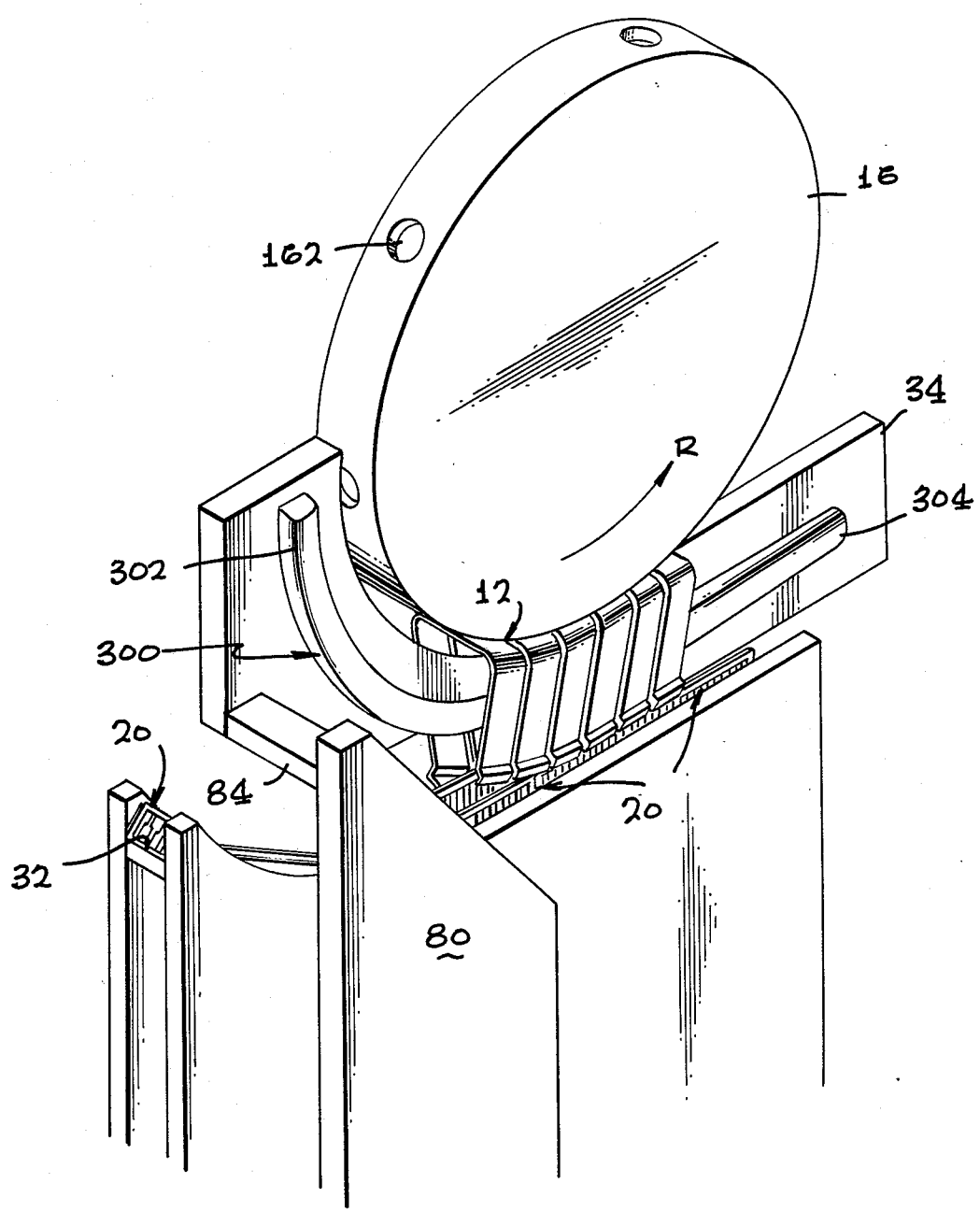

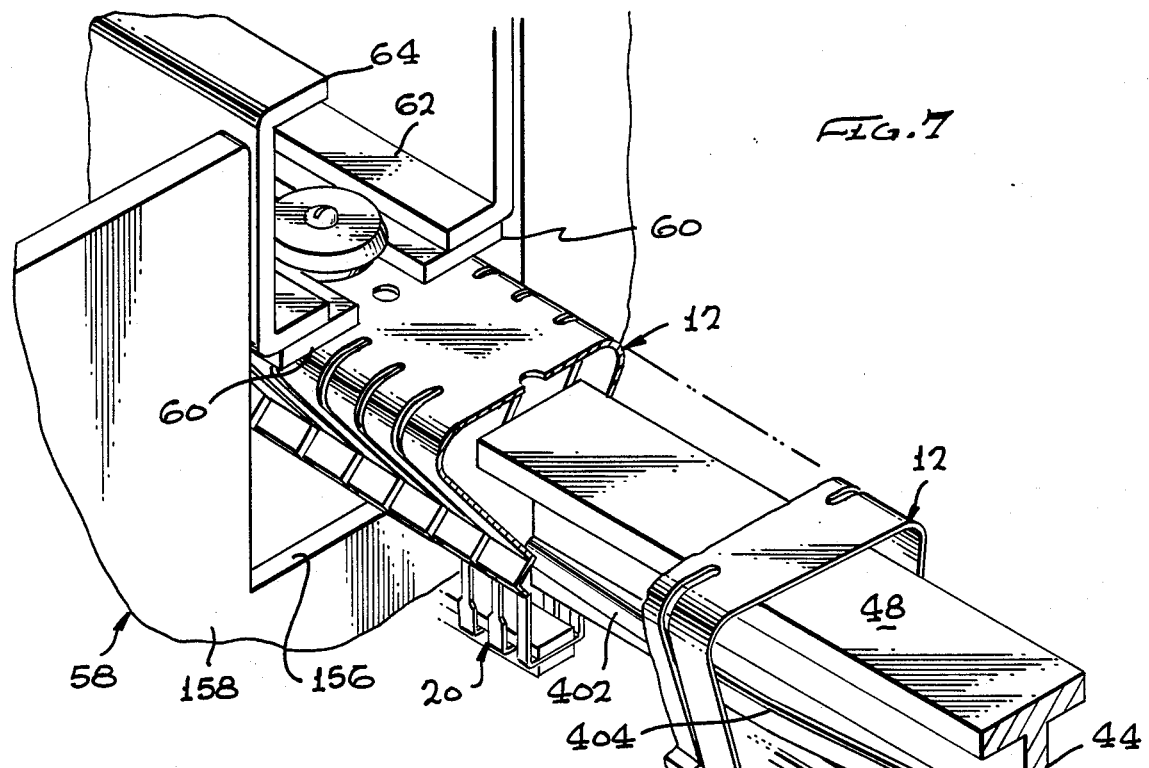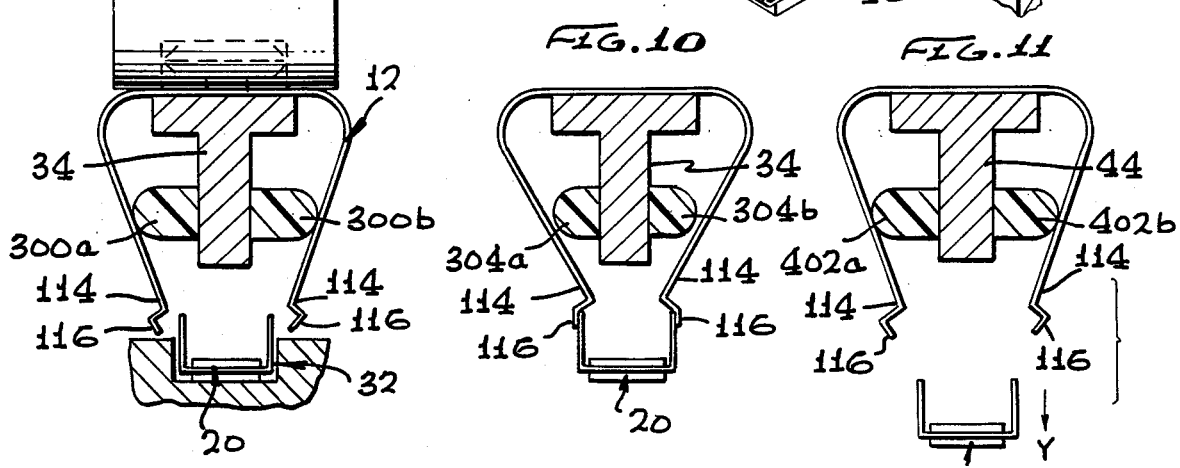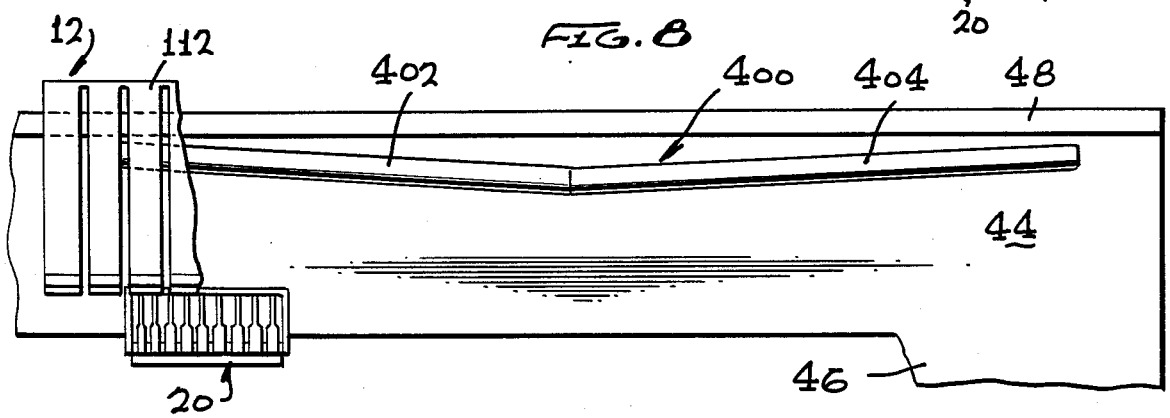

APPARATUS FOR CARRYING ENCAPSULATED ELECTRONIC COMPONENTS THROUGH ELECTROPLATING TANKS AND SURFACE TREATMENT STATIONS

BACKGROUND OF THE INVENTION

The invention relates to apparatus for electroplating the contact elements of encapsulated electronic components and like parts; it relates, more particularly, to means for conveying such components through a system composed of multiple surface treatment stations, including electroplating stations, suspended from an electrically conductive conveyor belt.

In the field of electronics it has been found advantageous to encapsulate delicate components—typically integrated circuit chips of various types—in electrically insulating bodies from which only contact elements, necessary to communicate with other portions of a completed circuit, protrude. It is particularly advantageous to create such insulating bodies by dipping the component to be protected into a ceramic slip and firing the ceramic material into a rigid protective body. Such ceramic encapsulated electronic components—known as sidebrazed ceramic packages, or C-dips for short—are particularly resistant to failure in environments which, because of chemical or thermal extremes, would affect the performance of unencapsulated components, or those whose protective sheaths are made from plastics or other less resistive materials.

A particular problem with such C-dip components relates to the relative mechanical fragility of the capsules during processing and handling operations subsequent to the firing of the ceramic sheaths. A serious problem exists with respect to the plating of the exterior contact elements—commonly with tin or precious metals, such as silver or gold—which is generally undertaken only after the components have successfully survived the encapsulating operations. Barrel plating and other methods which would subject the C-dips to severe mechanical stress are automatically foreclosed, and rack plating processes—requiring the manual placement of each component into plating baskets and their removal after plating is completed—are time-consuming and expensive.

The prior art has offered some solutions based on the entrainment of such parts on, or by, continuous conveyors of various types—including U.S. Patents to CURTIS (2,626,621), REID (3,066,091), GRIMALDI ET AL (3,878,062), WELTER (3,649,507), HELDER (4,032,414) and JOHNSON ET AL (4,508,611)—which failed to satisfactorily cure the handling and quality problems encountered in the electroplating—and in the associated surface treatment operations—the contact elements of sidebrazed ceramic packages and similar electronic components and their analogues, and found no wide acceptance in the practice of the art.

OBJECTS OF THE INVENTION

The principal object of the invention is to teach the construction of carrying apparatus for the conveying of encapsulated electronic components through systems for electroplating external contact elements integral with such components, including the use of a continuous, flexible conveyor belt constructed from an electrically conductive material and adapted to serve as one of the electrodes of the plating current circuit.

It is another object of the instant invention to teach the detailed construction of continuous conveyor belts for such employment; incorporating multiple pairs of elastic, mutually opposed grip fingers capable of safely suspending components engaged therebetween and ensuring a low-impedance electrical connection between the aforesaid conveyor belt and the parts engaged thereon.

It is an additional object of the invention to teach the development and construction of loading and unloading stations adapted to alternately impel the mutually opposed grip fingers to move apart and to permit their return toward an unstressed state, so as to allow for the engagement of parts therebetween and the subsequent release of such parts after the desired alteration thereof has been completed.

It is also an object of the invention to teach the construction of plating apparatus, including the carrying system thereof, which are adapted to uniformly and reliably applying electroplated coatings to the contact elements of ceramic-encapsulated electronic components, and their like, with a minimum of mechanical damage, and at an economic cost.

It is an additional object of the invention to provide apparatus of the character described hereinabove which is adaptable to permit various forms of surface treatment—cleaning and drying procedures among others—associated with continuous electroplating systems, and to allow for chemical processing of such parts, including, but not limited to, processes generally described as: electroless plating, immersion plating, electropolishing, phosphating and oxidizing processes.

SUMMARY OF THE INVENTION

The above objects of the invention—and other objects and advantages which shall become apparent from the detailed description of the preferred embodiment hereinbelow—are attained in a device which incorporates an endless, flexible conveyor belt propelled into circulatory motion in a continuous elongated loop around two cycles, with the return-inactive-leg of the loop moving directly above the lower-component-entraining-leg. The pulleys rotate on horizontal axes and at least one of them is impelled into continuous rotary motion by a drive motor. The belt is constructed with a substantially flat central web from which paired grip fingers extend outwardly.

The conveyor belt is made from an electrically conductive material unaffected by such electrolytes and treatment fluids as may be employed in electroplating apparatus for the contact elements of electronic components; such as a stainless steel alloy, titanium or cupronickel compositions. The outwardly extending pairs of grip fingers may be mechanically attached to the web of the conveyor belt or, in the preferred mode, be made integral therewith and bent into mutually opposing positions approximating a right angle with the web. The ends of the grip fingers may be shaped to engage those portions of the electronic components—the contact element array, for example, of a sidebrazed package—which are to be plated.

The grip fingers—and/or their attachment to the web of the conveyor belt—are made to be elastic, so that a force may be generated by spreading apart each pair of such fingers and maintaining them in a position of greater separation than their unstressed state. The loading of parts to be plated is accomplished in a loading station where a cam, positioned between the grip fingers, causes them to be spread apart as the component is moved into the opening so created or enlarged. The subsequent relaxation of the grip finger separation causes the component to be gripped and entrained into motion with the conveyor.

As the components held by the paired grip fingers move along the lower leg of the conveyor, they are subjected—in a sequence well-known in the plating art and forming no part of the instant invention—to cleansing and activation operations before entering one or more plating tanks, where the belt is made the cathode of the electroplating current supply. After the plating process—or processes if multiple coatings are applied—is complete, the parts are cleaned and dried and, finally, brought into an unloading station, where a cam, similar to that employed in the loading station, causes the grip fingers to separate further and release the completed parts into a suitable receptacle.

BRIEF DESCRIPTION OF THE ACCOMPANYING DRAWING

The invention will be described in detail hereinbelow with reference to the accompanying drawing, wherein:

FIG. 1 is a view, in elevation, of a plating system, including a number of stations for treating component surfaces prior to and after electroplating, employing the improved conveying apparatus of the invention for carrying such parts therethrough;

FIG. 2 is a perspective view of a typical sidebrazed, ceramic packaged, electronic component intended to be carried by the conveying apparatus of the invention, including the projecting external contact elements thereof;

FIG. 3 is another perspective view, showing a segment of the conveyor belt employed in the preferred embodiment of the invention for entraining components through an electroplating system;

FIG. 4a is a fragmentary, perspective view of the loading portion of the conveying apparatus of the invention;

FIG. 7 is a perspective view of a portion of the apparatus of FIG. 1, illustrating the discharge station area therein;

FIG. 8 is a view, in elevation, of the spreader cam at the discharge station shown in FIGS. 1, 5 and 7;

Figure 4:
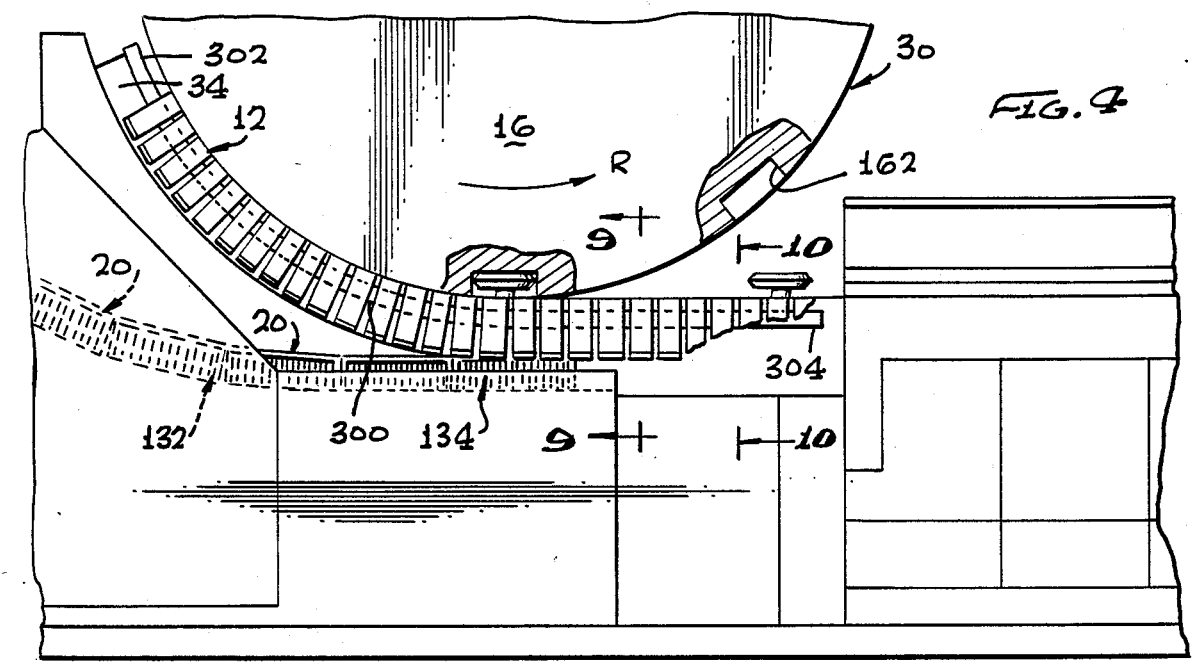
FIG. 4 is a detail, in partial section, of the apparatus of FIG. 1, particularly illustrating the loading station therein.
Figure 5:
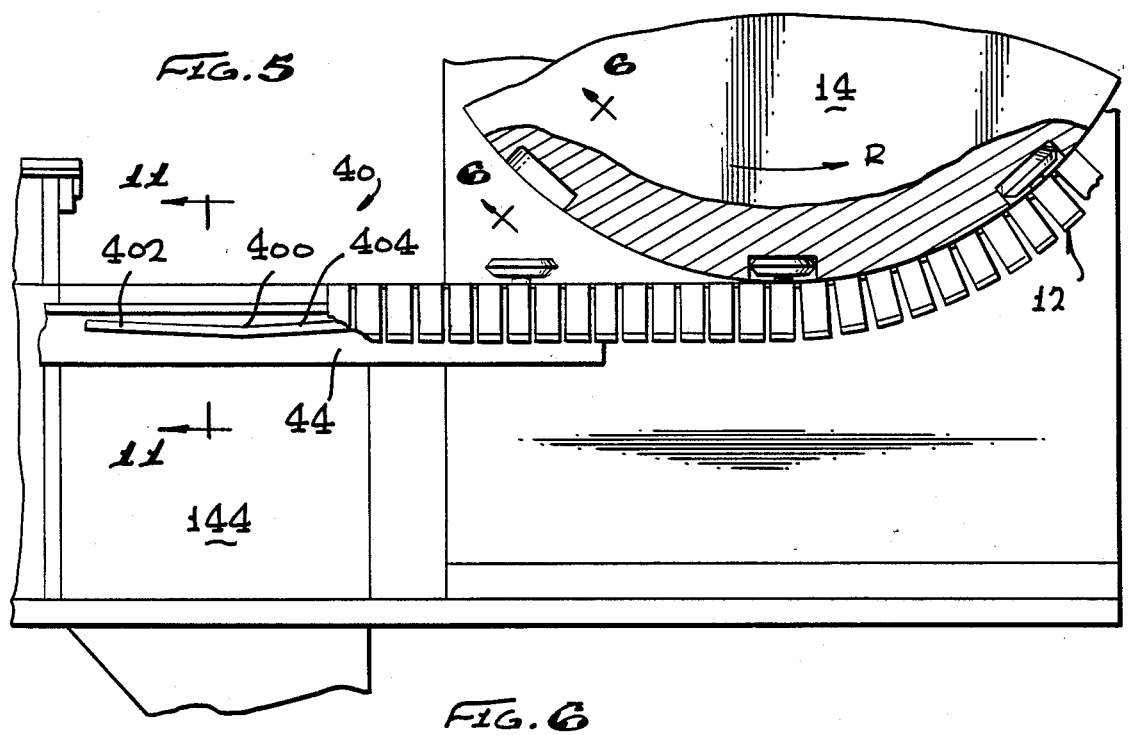
FIG. 5 is another detail, similar to that of FIG. 4, showing the unloading station area of the apparatus of FIG. 1.
Figure 12:
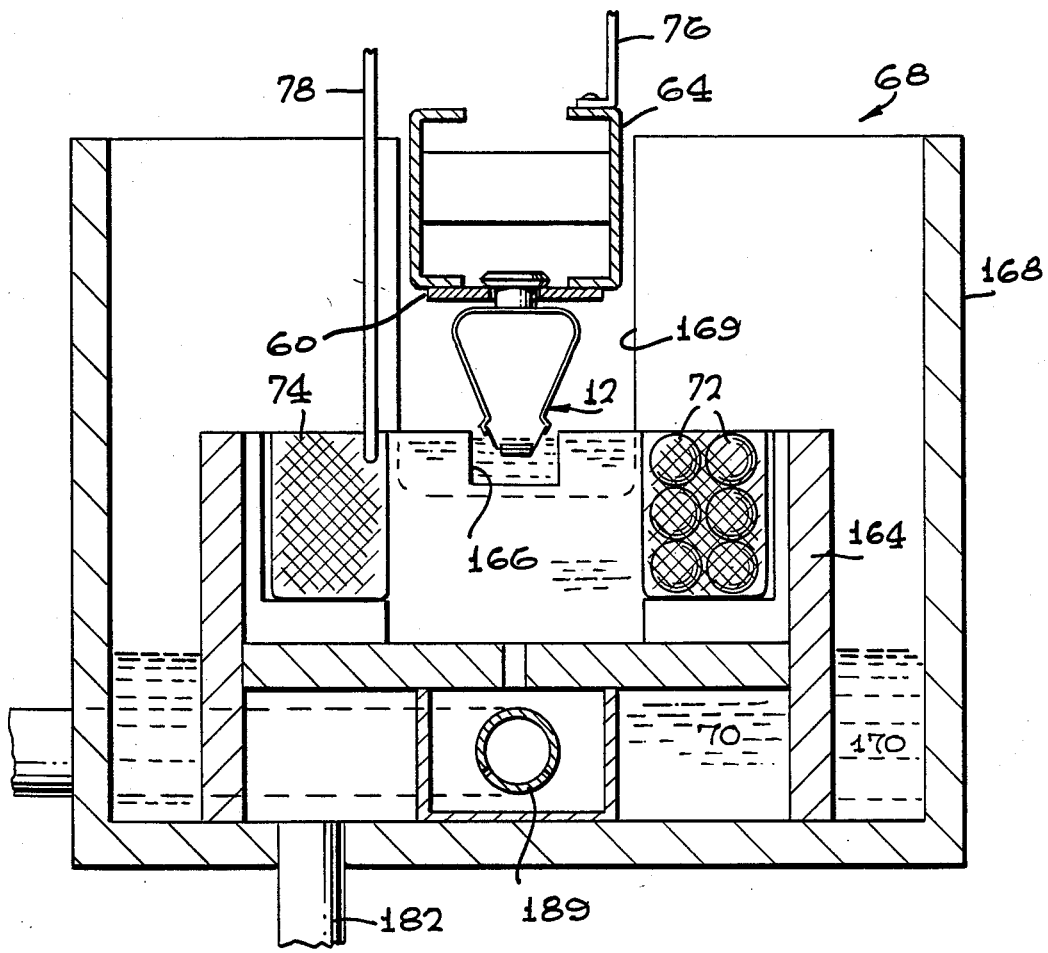
Figure 13:
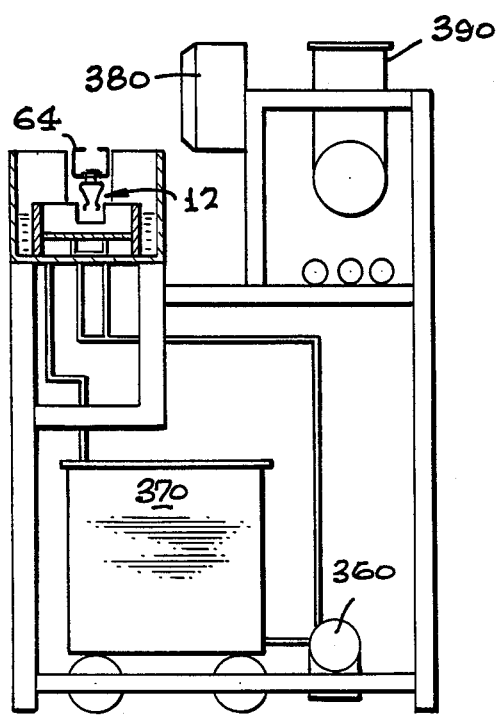

FIGS. 9, 10 and 11 are transverse sections—taken at section lines 9—9 and 10—10 in FIG. 4 and at section 11—11 in FIG. 5—through the conveyor belt of FIG. 1 at three specific locations along its working length—at the entrance to the loading station, at the exit of the loading station, and at the trailing end of the unloading station;

FIG. 12 is a cross-section through one of the electroplating stations in the apparatus of FIG. 1; and FIG. 13 is a cross-section through the apparatus of FIG. 1, taken at one of the treatment stations therein.

DESCRIPTION OF THE PREFERRED EMBODIMENT

The elevation of FIG. 1 shows a plating system 100, including a number of electroplating tanks and several surface treatment stations, adapted to apply electroplated coatings to parts carried through the system 100 by means of conveyor apparatus 10. In accordance with the teachings herein, the conveyor apparatus 10 is constituted with an endless conveyor belt 12, whose constructional details will be described with reference to FIG. 3 and other illustrations, which runs on two vertical pulleys 14 and 16.

With the pulleys arranged to be rotatable about substantially horizontal axes, the belt runs horizontally between tangent points on the pulleys, with the lower of the two horizontal runs representing the working portion of the belt 12. The belt is impelled into continuous motion by a drive—typically an electric motor/gearbox combination—imparting rotational motion to the pulley 14; the pulley 16 serves as a return roller and tensioner for the conveyor belt 12.

A loading station 30 is provided at the pulley 16, the start of the working length of the belt 12; an unloading station 40 is provided as the belt approaches the point of tangency with the driving pulley 14. The loading station is provided with a part loading slide 32 which conveys parts, properly aligned for entrainment by the conveying apparatus, to be plated to the conveyor belt 10 at the point where it leaves its semicicular path around the outer face of pulley 16.

The parts for which the system 100, with its component carrying apparatus 10, is principally intended, belong the family of electronic devices encapsulated in ceramic bodies, generally known as C-dips. This designation arises from the dipping of such components—most generally integrated circuit chips—into a ceramic slurry, after the external contact array has been attached to the active components, and the subsequent firing of the slurry into a rigid ceramic body. Such devices are commonly referred to by the generic designation of 'sidebrazed ceramic packages'. Because of the brittle nature of the encapsulating material such devices require particularly careful handling in subsequent manufacturing operations.

A typical, ceramic-encapsulated, sidebrazed electronic package 20 is shown in the perspective view of FIG. 2. A ceramic sheath 22 encompasses all the active components of the package and an array of contact fingers 24 extends from either side of the sheath 22. Because of the fragility of the ceramic sheath 22, the array of contact fingers is bent into its final alignment before encapsulation and is reinforced by a peripheral rail 26 for support during further processing, including electroplating.

FIG. 3 is a perspective view of a short segment of the conveyor belt 12. The belt 12 is constructed from an elastic and conductive material unaffected by the chemical and electrical environment of the electroplating system 100, typically by selecting a stainless steel as the constructional material. The belt is preferably made as an integral array of grip fingers 114 depending from a central spine formed by web 112. The grip fingers 114 are formed in opposing, phased pairs, such a pair 114a and 114x, which are mirror images of one another and aligned orthogonally to the centerline of web 112. The tip of each grip finger 114 is formed into a pad 116, adapted to engage a longitudinal rail 28 of the frame 26 of part 20, or a similar portion of other workpieces, as appropriate.

The grip fingers 114 are so shaped and dimensioned that, upon being spread apart from their unloaded rest positions, the part 20 may be readily positioned with its rails 28 between the pads 116. Upon the removal of the forces applied to spread the fingers 114, the pads 116 engage the rails 28 with sufficient residual force to securely suspend the part 20 below the web 12 by the frictional forces generated therebetween.

The web 112 of the conveyor belt 12 is pierced by regularly spaced orifices 122 along its axis of symmetry. Cam buttons 120 are attached to the belt 12, suitably by means of threaded fasteners or rivets passing through such orifices, at fixed intervals. The cams 120 engage mating pockets 162 in the peripheries of pulleys 14 and 16 and serve to propel and align the belt 12—formed into an endless, flexible loop for use in the conveying apparatus 10—with the drive components therein.

The loading station 30 is illustrated in the fragmentary elevation of FIG. 4. A portion of the idler pulley 16 is shown, in partial section to expose peripheral pockets 162 which engage the cam buttons 120 of the belt 12. The belt is shown draped around the pulley 10 and passing over a spreader cam 300 which is parallel to the periphery of the pulley 16 for approximately 45 degrees preceding the point of tangency of the conveyor belt, and then proceeds horizontally for some distance within the belt 12.

A leading portion 302 of the spreader cam 300 is designed with an increasing cross-section—as seen from a position transverse to the run of the conveyor belt 12—until the thickness of the cam comes to correspond to the fully spread-apart condition of grip fingers 114. The central portion of the cam 300, extending some distance past the aforementioned point of tangency, is of a constant thickness and maintains the open alignment of the grip fingers. A trailing portion 304 completes the cam 300, its reducing cross-section—in the direction of travel of the belt 12, corresponding to the rotation of the pulley 16 in the direction of arrow R—allows the gradual reclosure of the grip fingers 114.

The part loading slide 32—an arcuate groove similar in shape to a ski jump followed by a horizontal extension lying below, and aligned with, the belt 12 just past its point of tangency to pulley 16—feeds parts 20, or their analogues, into juxtaposition of rails 28 with pads 116. To this end, parts 20 are loaded, from a bin 36, into the upper end of the loading slide 32 with their projecting contact finger arrays pointing upwardly.

A significant constructional feature of the loading station 30 lies in the cam 300 being supported on a central spline, or cam support, 34 secured to the support structure of the slide 32 at its upper end. The lower end of the cam support 34 is cantilevered into the space between the inner surface of the conveyor belt web 112 and the base of the slide 32, so as to permit the free movement of parts 20 in the groove of the slide, as illustrated in the sectional view of FIG. 9.

The perspective view of FIG. 4a shows the same components as the illustration of FIG. 4, but, due to the perspective afforded permits the clear depiction of the manner in which the cam support plate 34 is maintained in a cantilevered position above the part loading slide 32, and below the distal surface of the idler pulley 16. The floating alignment of the cam support plate 34 permits the ready passage thereover of the conveyor belt 12 and allows for the operation of the grip fingers 114 by means of the cam 300. The cam support plate 34 is maintained in this position by attachment to a bridgepiece 84 which is itself secured to cam support pedestal 80.

FIG. 5 is a fragmentary view, in elevation, of the plating system 100, particularly illustrating the unloading station 40 therein. A portion of the drive pulley 14 is shown, engaging the cam buttons 120 of the conveyor belt 12, which is entrained by the drive system into motion to the right in the illustration, in the sense of arrow R.

The conveyor belt brings into the unloading station area the parts 20 which were engaged with it in the loading station 30. These parts, with their contact fingers now plated, are caused to drop from the conveyor belt 12 into receiving chute 144—and thence into receiving container 146—by means of a spreader cam 400. The cam 400 is constructed similarly to the spreader cam 300 at the loading station 30. Both spreader cams are split into identical, mirror-image halves and mounted on either side of a cam support plate—34 at the infeed end and 44 at the outfeed end, respectively—and both are constructed from a material such as a high-density nylon—which exhibits low frictional resistance when bearing against the grip fingers 114.

The principal difference between cams 300 and 400 is that the latter does not require an extended central section of constant depth, and is, effectively, comprised of an expanding cross-section portion 402 and a contracting cross-section portion 404 only. This is sufficient to secure the release of parts 20 from the conveyor belt 12, through the release of the grip of pads 116 against the rails 28 of the encapsulated parts, and to permit their discharge from the plating system under the influence of gravitational forces, in the direction of arrow Y in FIG. 11.

Figure 6:
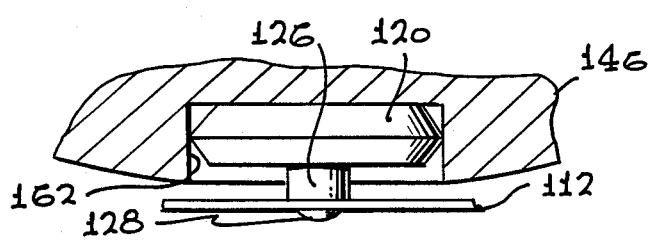
FIG. 6 is a fragmentary detail—in section, taken along section line 6—6 in FIG. 5—of a typical indentation in the periphery of one of the two pulleys in the carrying apparatus, adapted to engage cams associated with the endless conveyor belt therein.

FIG. 6 is a fragmentary section of a pulley 146, employable at either end of the conveyor apparatus 10, taken through the plane of symmetry of the pulley, thereby exposing a cavity 162 with the cam button 120 seated therein. In the preferred embodiment of the invention, the cam 120 is offset from the upper surface of the web 112 of the conveyor belt by a short spacer 112, and its head is formed as a frustrum of a cone whose largest diameter is matched by that of the cavity 162. Aided by the angled flanks of the cam button, the two parts readily slide into intimate engagement as the belt 12 approaches the periphery of a pulley.

The perspective view of FIG. 7 shows the terminal transition area of the plating system 100 where the conveyor belt 12 leaves a final treatment station 58 and enters the unloading station 40. The cam support plate 44 is shown cantilevered from its base leg 46 with the rail 48 superposed thereon. The rail 48 forms a base to support the belt 12 in the event of material sag in the latter, so as to maintain the efficacy of the spreader cam 400 in imposing sufficient lateral movement on the grip fingers 114 to secure the release of parts 20 from the conveying apparatus.

Also visible in the view of FIG. 7 is the outfeed end of horizontal beam 64, a structural member which is continuous between loading station 30 and unloading station 40, but spaced a short distance from both. This beam, constructed from a nonconductive material in the preferred embodiment of the carrying system of the invention, passes through all the stations of the electroplating system 100 and forms the main support for the conveyor belt 12 between its guiding pulleys 14 and 16.

The beam is provided with a central, continuous, longitudinal slit in its distal face; this slit is flanked by rails 60 affixed to the beam 64, forming a continuous track along the centerline of the beam.

The rails 60 are made from a conductive material and form the main cathode connection of the electrical circuit of the electroplating stations incorporated into the system 100; they also support the basal surfaces of the cam buttons 120 which, in their passage between the two pulleys of the conveyor apparatus, serve the additional function of hangers for the conveyor belt 120. In this area, the shank 126 of the cams 120 serves as a spacer to allow for the thickness of the conductive rails 60 to supervene above the upper surface of the web 112 without rubbing contact therebetween. The rails 60 are secured to the beam 64 by means of fasteners 62—suitably removable screws, to permit the replacement of the rails 60 should wear shorten their service life. The cam buttons 120 are similarly subject to wear as a result of their contact with the rails 60 and are preferentially secured into the orifices 122 by means of threaded fasteners 128.

FIG. 8 is a view, in elevation, of the cam support plate 44 and its pedestal leg 46 from which the cam support plate is cantilevered. The pedestal 46 is located in a region of the carrying apparatus where the plated and treated parts have already been released from the conveyor belt 12 and where the gap between the pads 116 of the spaced grip fingers 114 on either side of the web 112—such as grip fingers 114a and 114x in FIG. 3—permits the positioning of fixed structural components. It should also be noted that the cam 400 seen from one side of the cam support plate is only one half of the operative cam 400, which is composed of two half cams mounted on either side of the cam support plate 44.

The cam 400 is developed so that its leading portion 402 not only increases in thickness in the direction of conveyor travel, but is also angled downwardly with respect to th nominal path of the conveyor web 112. This development allows for some sag from the aforementioned nominal path of the web and its potential droop through the small gap down to the surface of the cam support plate rail 48 without affecting the operation of cam 400. The trailing portion 404 of the cam 400 is developed in an inverted form of the portion 402, with the thickness reducing and the elevation rising towards its trailing edge.

FIG. 9 is a transverse section—taken along section line 9—9 in FIG. 4—of the conveyor belt 12 at the infeed portion of the loading station 30. The grip fingers 114 of the belt are seen displaced outwardly by cam 300—whose constituent halves 300a and 300b are clearly visible in this illustration, mounted on either face of the cam mounting plate 34—creating a gap between the inner faces of pads 116 at the ends of the tines 114 and the uppermost rails 28 of parts 20 in the part loading slide 32. The parts 20 move forward, out of the plane of the illustration, either by the action of gravitational forces acting on the following parts 20 in the arcuate portion of the slide 32, or, where this is deemed insufficient or inappropriate, by means of feeder devices or a friction conveyor coating with the slide 32 to cause the required movement into the space below the spread fingers of the conveyor belt 12 at this location. In either case, the motion of the parts in the groove of the slide 32 is governed by the speed of the conveyor belt 12, through the entrainment of the foremost part 20 at any instant in the operation of the loading station.

FIG. 10 is another transverse section—taken along section line 10—10 in FIG. 3—showing the outfeed portion of the conveyor belt at the loading station 30, a few inches downstream from the view of FIG. 9. At this location the belt is passing the reducing thickness portion 304 of the cam 300 and the distal ends 116 of the grip fingers 114 have been clamped onto the rails 28 of the part 20 directly below the belt, thereby entraining that part with the conveyor. The clamping forces necessary to securely grip the rail 28 and to support the weight of the part 20 are provided TBY the residual elastic strain of the grip fingers, as compared to their unloaded condition shown in FIG. 3, induced by the action of the cam 300.

FIG. 11 is a third transverse section through the conveyor belt—taken along section line 11—11 in FIG. 4—showing the interaction of the expanding infeed segment 402 of the cam 400 with the grip fingers of the conveyor belt 12. The increase in the thickness of the cam 400 causes a forcible separation of the grip fingers 112, thereby releasing their frictional grip on the parts 20 and restoring the relative positions shown in FIG. 9. Since at the discharge station there is no support element corresponding to the feed slide 32 at the loading station, the parts released by the grip finger pads 116 drop, under the action of the force of gravity, in the direction of the arrow Y into discharge chute 144. These parts, released after passing the plating and treatment stations of the plating system 100, fall into a receiving container 142 for finished components.

FIG. 12 is a transverse section taken through a typical plating station 68 of the electroplating and surface treatment system 100. In such stations the parts carried by the conveyor 12 are made the cathode of a direct-current electrical circuit and are immersed on a volume of electrolyte 70. This electrolytic bath is created and maintained by a continuous flow—through feed channel 180, terminating in a sparger tube section with a plurality of small orifices, so as tro control electrolyte trubulence—of such fluid from a larger reservoir and by the controlled discharge of the fluid weirs 166 in the end panels of an inner plating tank 164. The electrical circuit is completed through anode balls 72, resting in conductive baskets 74 connected by cable 78 to the source of DC current. The substance of the anode balls—suitably tin metal—is plated out onto the conductive surfaces of the contact fingers 24 of parts 20, which are connected to the same DC source as the anode bars—via a cable 76 and a conductive path incorporating rails 60 in contact with the cam buttons 128 of the conveyor 12. Since the conveyor belt and its cam buttons are constructed from electrically conductive materials, the current is readily passed from the cable 76 to the surfaces of the contact fingers to be plated.

The plating tank 164 is surrounded by a larger, outer tank 168 into which the electrolyte 70 is continously discharged through weirs 166. The outer tank 168 is provided with cutouts 169, in line with corresponding to the weirs 166, to allow for the passage of the conveyor belt 12. The electrolyte forms a pool 170 in the outer tank 168 and is drained back into he storage container through conduit 182.

FIG. 13 is a transverse section through the system 100 at the position of treatment tank 58, wherein parts 20 are washed—typically in distilled water—to remove any traces of electrolyte or other chemically active fluid which had been in contact with the pairs carried on conveyor belt 12. The details of station 58 are the same as those associated with station 68, apart from the absence of any anode bars or balls and of electrical connectors forming part of the plating circuit. The pool in the inner tank of station 58 drains through weirs similar to weirs 166, with the washing water draining into tank 370 and recirculated, where appropriate, by means of a pump 360. Also visible in FIG. 13 are an air blower 390—for drying the parts exiting the station 58—and control box 380—for controlling the operation of the main drive to pulley 14.

What is claimed is:

1. In a system for electroplating and applying surface treatments to electronic parts and their like—wherein the individual stations for plating and treatment are arrayed in a linear, sequential manner and wherein all stations requiring the immersion of such parts into a liquid medium incorporate tanks with overflow weirs in the ends of the tanks, to allow parts, moving in a horizontal path above the metering edge of the weirs, to enter such liquid baths in the appropriate stations—an improved apparatus for carrying said parts through the aligned array of treatment and plating stations, comprising:

a pair of pulleys rotatable around horizontal axes and aligned with the centerline of the array of plating and treatment stations, with one pulley spaced from one end of said array, and the other pulley spaced from the other end of said array;

means for impelling at least one of said pulleys into controlled rotational motion;

a continuous, flexible, conveyor belt stretched over said pair of pulleys for entrainment thereby, with a forwardly moving, lower web of said belt passing through the linearly aligned overflow weirs of said array of plating and treatment stations, and a return portion of said web moving above said array, said conveyor belt being constructed of an electrically conductive material;

a plurality of equispaced, laterally opposed, elastic, electrically conductive grip fingers projecting outwardly from either edge of the web of said conveyor belt, each pair of said grip fingers forming a co-acting frictional vise symmetrical about the longitudinal centerline of the web, shaped and adapted to securely suspend parts to be affected by said array of plating and treatment stations;

a loading station, adapted to insert parts between groups of pairs of said grip fingers, positioned between said one pulley and the first of said array of stations;

an unloading station, adapted to secure the release of plated and treated parts from said conveyor belt, positioned between said other pulley and the terminal one of said array of stations;

a pair of linear rails of conductive material, in parallel alignment with respect to one-another and spaced on either side of the longitudinal centerline of said conveyor belt, positioned between said loading station and said unloading station at an elevation above the upper face of the conveyor belt;

a plurality of engagement cams, affixed at uniform intervals to said upper surface of the conveyor belt along its longitudinal centerline, said cams being constructed from an electrically conductive material and adapted to slidingly engage the upper surfaces of said rails during their transit through the system; and direct current supply means, including contact elements adapted to transfer cathode current to the moving conveyor belt, for energizing the electroplating stations in said array of plating and treatment stations.

2. The improved parts carrying apparatus of claim 1, wherein said conveyor belt is constructed from a stainless steel alloy.

3. The improved parts carrying apparatus of claim 1, wherein said conveyor belt and said plurality of grip fingers are constructed integrally from a stainles steel alloy.

4. The improved parts carrying apparatus of claim 3, additionally comprising:

a pair of linear rails of conductive material, in parallel alignment with respect to one-another and spaced on either side of the longitudinal centerline of said conveyor belt, positioned between said loading station and said unloading station at an elevation above the upper face of the conveyor belt; and a plurality of engagement cams, affixed at uniform intervals to said upper surface of the conveyor belt along its longitudinal centerline, said cams being constructed from an electrically conductive material and adopted to slidingly engage the upper surfaces of said rails during their transit through the system.

5. The apparatus of claim 1, wherein said contact elements convey cathode current to at least one of said rails.

6. The apparatus of claim 5, wherein said pulleys carry indentations in their circumference at intervals corresponding to said uniform intervals between said engagement cams on said conveyor belt; for the receiving of said cams in intimate contact with said indentations during the traverse of said belt over the peripheries of said pulleys.

7. The apparatus of claim 3, or of claim 6, wherein said loading station encompasses:

a first spreader cam positioned below the lower chord of said web of the conveyor belt and adapted to secure the separation of said grip fingers laterally away from their rest positions, at a location preceding the separation of said belt from said one pulley at the nethermost point of tangency of the belt with respect to said one pulley, and, at a location proximate to the entrance of the belt into said first station, to relax the grip fingers toward their rest positions; and a parts slide, channeling parts to a guideway positioned below the web of said belt so as to permit the engagement of such parts by the distal portions of said grip fingers as the fingers are allowed to relax by said first spreader cam, and the consequent entrainment of the parts by the conveyor belt for carriage through the array of plating and treatment stations.

8. The apparatus of claim 7, wherein said unloading station includes a second spreader cam adapted to urge the separation of the grip fingers of said conveyor belt at a location proximate to the exit of said belt from the terminal station in the plating and treatment system, thereby releasing said parts from engagement with the belt, and, at a location proximate to the point of entrainment of the belt with said other pulley, allowing the grip fingers to relax toward their rest positions.

9. The apparatus of claim 1, said apparatus being adapted to convey electronic parts in the form of sidebrazed ceramic packages.

* * * * *